United States Patent [19]
Phillips

[11] Patent Number: 6,059,213
[45] Date of Patent: May 9, 2000

[54] REEL DEVICE

[76] Inventor: John Quentin Phillips, 30 Mount Avenue, Ealing, London, W5 2QJ, United Kingdom

[21] Appl. No.: 09/033,171

[22] Filed: Mar. 2, 1998

[30] Foreign Application Priority Data

Feb. 28, 1997 [GB] United Kingdom .................. 9704203

[51] Int. Cl.⁷ .................................................. B65H 75/48
[52] U.S. Cl. .................................. 242/378.4; 242/378.2; 242/385.4; 242/388.1; 242/388.3; 191/12.4
[58] Field of Search .............................. 242/378.2, 378.4, 242/388, 388.1, 388.3, 385.3, 385.4; 191/12.4; 439/15

[56] References Cited

U.S. PATENT DOCUMENTS

| | | | |
|---|---|---|---|
| 2,678,779 | 5/1954 | Bellmer | 242/378.2 |
| 3,346,705 | 10/1967 | Slinkard et al. | 191/12.4 |
| 3,585,324 | 6/1971 | Renndorfer et al. | 191/12.4 |
| 3,773,987 | 11/1973 | Davis et al. | 191/12.4 |
| 3,854,017 | 12/1974 | Crim . | |
| 4,417,703 | 11/1983 | Weinhold | 242/385.4 |
| 4,499,341 | 2/1985 | Boyd | 191/12.4 |
| 4,696,523 | 9/1987 | Schauer et al. | 439/15 |
| 4,802,638 | 2/1989 | Burger et al. | 242/388.1 |
| 4,940,859 | 7/1990 | Peterson | 191/12.4 |
| 4,989,805 | 2/1991 | Burke . | |
| 5,023,410 | 6/1991 | Danielson et al. | 191/12.4 |
| 5,156,242 | 10/1992 | Ditzig | 191/12.4 |
| 5,180,040 | 1/1993 | Ji | 191/12.4 |
| 5,241,593 | 8/1993 | Wagner . | |
| 5,299,670 | 4/1994 | Willard | 191/12.4 |
| 5,339,461 | 8/1994 | Luplow | 455/351 |
| 5,535,960 | 7/1996 | Skowronski et al. | 242/378.4 |
| 5,581,821 | 12/1996 | Nakano | 242/385.3 |
| 5,670,989 | 9/1997 | Owen | 242/378.4 X |
| 5,700,150 | 12/1997 | Morin | 191/12.4 |
| 5,701,981 | 12/1997 | Marshall et al. | 191/12.4 |
| 5,853,136 | 12/1998 | Lai | 242/388.1 |

FOREIGN PATENT DOCUMENTS

| | | |
|---|---|---|
| 35 18 157 | 5/1985 | Germany . |
| 697640 | 3/1951 | United Kingdom . |
| 1 590 160 | 5/1978 | United Kingdom . |
| 2 148 847 | 10/1983 | United Kingdom . |
| 2 210 020 | 7/1988 | United Kingdom . |

OTHER PUBLICATIONS

Search Report prepared by Great Britain.

*Primary Examiner*—Donald P. Walsh
*Assistant Examiner*—William A. Rivera
*Attorney, Agent, or Firm*—McDermott, Will & Emery

[57] ABSTRACT

A reeling device which allows an electrical lead to be wound up without the need for slip-rings. The lead is partially wound around a spool and is electrically connected to contacts in a spindle, about which the spool rotates. A portion of the lead is sprung and is loaded as the spool rotates to pay out the lead. A ratchet and pawl mechanism is provided to lock the lead in its extended configuration. The ratchet and pawl mechanism can be relased so that the lead is retracted using the energy stored in the sprung portion of the lead. A pair of the reeling devices may be combined back-to-back to provide convenient storage for earpiece and plug leads for a headset. The reeling device may also be integrated into a portable electronic apparatus for storing earpiece or microphone leads.

11 Claims, 5 Drawing Sheets

REEL DEVICE

FIELD OF THE INVENTION

The present invention relates to a reeling device for an electrical lead.

BACKGROUND TO THE INVENTION

It is known that it is desirable to be able to wind up electrical leads when they are not in use. A problem with reeling devices for electrical leads is that an electrical connection must be made to a lead on a rotating spool. The prior art solutions to this problem fall into two categories. In one category are devices which employ two coils of different diameters arranged such that as a lead is drawn from the large coil, the turns of the smaller coil can separate, e.g. U.S. Pat. No. 4,989,805. The other category comprises devices that use slip rings to make electrical connections to a lead on a spool, e.g. U.S. Pat. No. 5,339,461.

Devices in the first category have not established themselves in the marketplace and it is believed that this is because they have proved unreliable. Devices in the second category are unsuitable for small signal applications, for example microphone or headphone leads, because of noise caused by the slip ring contacts.

SUMMARY OF THE INVENTION

It is an aim of the present invention to overcome the afore-mentioned problems.

According to the present invention, there is provided a reel device comprising an elongate structure, providing a continuous electrically conducting path along substantially its whole length and including an electrical lead, a fixed spindle to which an end of the structure is fixedly connected and rotary means for winding the lead around the spindle for bringing the lead into a retracted configuration from an extended configuration. Thus, according to the present invention, there is no relative motion between one end of an electrical lead and the static portions of the reeling device.

The rotary means may comprise a rotatable disc with an aperture through which the lead extends such that as the disc is rotated, the lead is wound up or unwound. However, preferably, the rotary means comprises a spool onto which the lead is wound when the lead is in its retracted configuration.

Preferably, a releasable locking means is provided for looking the reeling device with the lead in an extended configuration. The locking means preferably comprises a ratchet and pawl mechanism, the, ratchet being provided on the rotary means. However, the locking means may be in the form of a brake acting on the rotary means or the lead.

Preferably, a spring means is configured to drive the rotary means for retracting the lead from an extended configuration. More preferably, the spool is coupled to the spindle by a spring. The spindle is preferably coaxial with the spool and is conveniently within the spool.

Preferably, the afore-mentioned structure is integrated with the spring. In this case, the structure may comprise a flexible conductor mounted to the spring. However, the flexible conductor may merely follow the path of the spring, e.g. between the coils of the spring, without being attached thereto or being unattached along a substantial portion of the length of the spring. More preferably, the conductor and the spring are embedded together in a flexibly resilient polymeric material. An alternative is to use a polymeric spring, for example formed from polycarbonate, and form conductive foil tracks on the spring in the manner of a printed circuit board.

The present invention is particularly useful where the lead is to carry small signals such as those to headphones or from microphones.

Conveniently, a device according to the present invention may be mounted in an electronic data processing apparatus or in connection with a headset.

DESCRIPTION OF PREFERRED EMBODIMENTS

Embodiments of the present invention will now be described, by way of example, with reference to the accompanying drawings.

Figure 1:
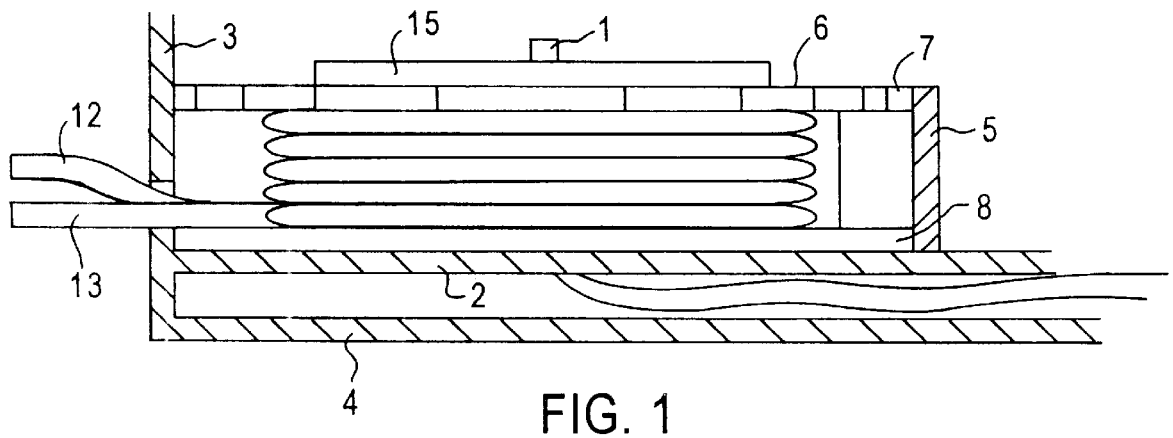
FIG. 1 is a cross-sectional view of a device according to the present invention.
Figure 2:
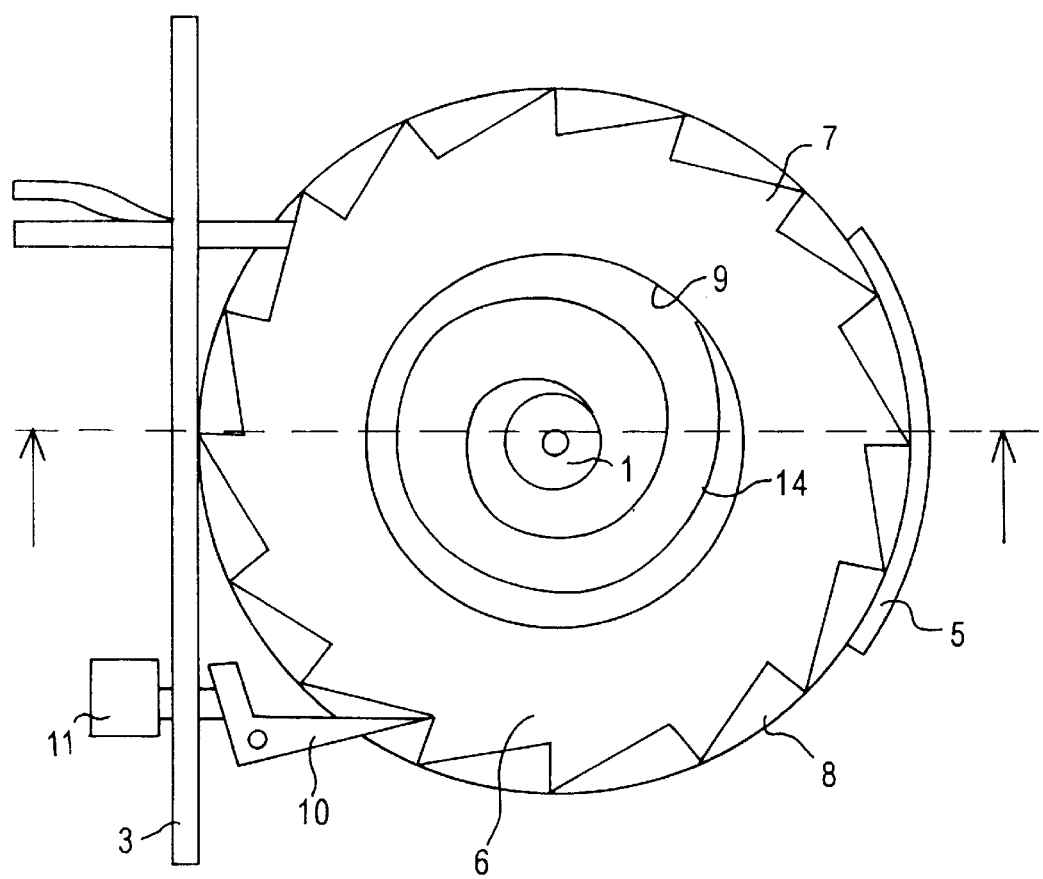
FIG. 2 is a plan view of the device of FIG. 1 with its spring cover removed.

Referring to FIGS. 1 and 2, which are intended to assist the reader in achieving a general understanding of the present invention rather than illustrate a particular application, a fixed spindle 1 projects from a chassis member 2. The chassis member 2 projects perpendicularly from a first case member 3 and lies parallel to a second case member 4. An arcuate wall 5 projects upwardly from the chassis member 2, defining together with the first case member 3, a space in which a rotatable spool 6 is located.

The spool 6 comprises parallel spaced first and second annular flanges 7, 8 connected by an open-ended cylindrical member 9. The spool 6 is coaxial with the spindle 1. The first flange 7 has a ratchet formed in its radially outer margin. A spring biased pawl 10 is located between the spool 6 and the first case member 3 and engages the ratchet on the spool 6. A push button 11 extends through the first case portion 3 and bears against the pawl 10. When the push button 11 is depressed, the pawl 10 is released from the ratchet.

A pair of flexible leads 12, 13 are wound around the spool 6. The proximal ends of the flexible leads 12, 13 are coupled to one end of a sprung lead 14 coiled within the spool 6. The other end of the sprung lead 14 is fixed to the spindle 1. The spindle 1 is provided with electrical contacts for providing electrical connections to signal carrying parts of the sprung lead 14.

A cover 15 is retained over the sprung lead 14 by a latch on the spindle 1.

Figure 3:
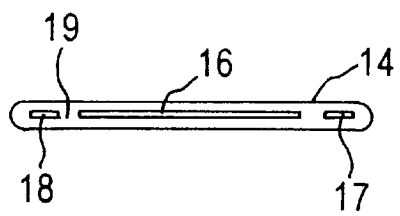
FIG. 3 is a cross-sectional view of the sprung portion of the lead of the device of FIG. 1.

Referring to FIG. 3, the sprung lead 14 comprises a strip 16 of spring steel, a first braided conductor 17 to one side of the strip 16 and a second braided conductor 18 to the other side of the strip 16. The strip 16 and the braided conductors 17, 18 are embedded in flexible polymeric material 19 to form a structure which is itself an elongate strip. The amount of polymeric material used should be kept to a minimum consistent with structural integrity and ensuring isolation between the steel strip 16 and the braided conductors 17, 18.

Figure 4:
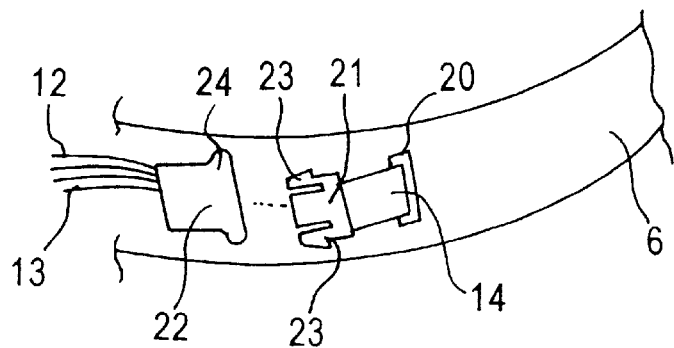
FIG. 4 is a detail view showing the lead as it passes through the spool of the device of FIG. 1.

Referring to FIG. 4, the sprung lead 14 has a short portion extending through a sic 20 in the spool 6. A plug 21 is mounted to the end of the sprung lead 14. The plug 21 has pins (not shown) connected to respective braided conductors 17, 18. An in-line socket 22 is connected to the proximal ends of the leads 12, 13 and is adapted to receive the plug 21 to establish an electrical connection between the braided conductors 17, 18 and the leads 12, 13.

The plug 21 is provided with latch members 23 which engage with the socket 22 to lock the plug 21 and the socket 22 together.

The socket 22 is provided with an enlarged portion 24 to prevent it being drawn through the slot 20.

Figure 5:
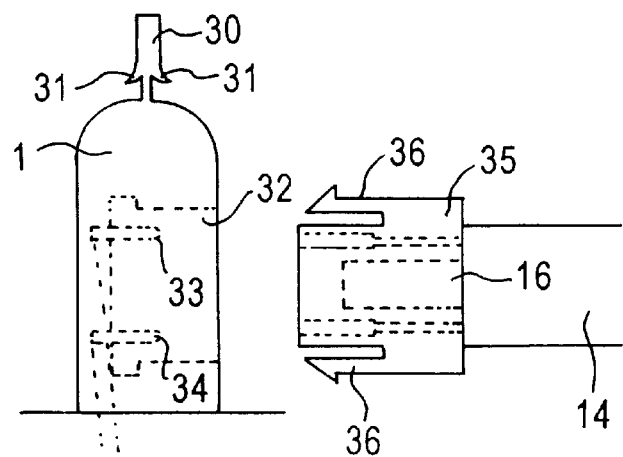
FIG. 5 is a detail view of the spindle of the device of FIG. 1.

Referring to FIG. 5, the spindle 1 is generally cylindrical and is provided with a reduced diameter portion 30 at its distal end. The reduced diameter portion 30 is provided with flexible tangs 31 for retaining the spring cover 15 (FIG. 1) in place. A socket 32 with a radial opening is formed in the spindle 1. The socket includes first and second electrical contact pins 33, 34.

The inner end of the sprung lead 14 is provided with a plug 35 for cooperation with the socket 32. The plug 35 includes contacts for receiving the pins 33, 34 and latching members 36 for retaining it in the socket 32. The spring steel strip 16 of the sprung lead 14 extends into the plug 35 such that, when the plug 35 and socket 32 are united, the strip 16 extends into the spindle 1 thereby reinforcing the connection between th sprung lead 14 and the spindle 1.

The operation of the reeling device of FIGS. 1 to 5 will now be described.

In an initial condition, the leads 12, 13 are full wound around the spool 6 and the sprung lead 14 is fully relaxed, in which condition most of its turns are located at or close to the inner surface of the cylindrical member 9 of the spool 6. If the leads 12, 13 are now pulled, the spool 6 will rotate. As the spool 6 rotates, the sprung lead 14 is wound further around the spindle 6, increasing the number of turns about the spindle 1 and causing the turns to move away from the inner surface of the cylindrical member 9 towards the spindle 1. In other words, the sprung lead 14 is wound more tightly about the spindle 1. If the force on the leads 12, 13 is now removed, the sprung lead 14 will attempt to relax and rotate the spool 6 in the other direction. However, the spool 6 is prevented from rotating by the rachet and pawl 18.

If a user wished to retract the leads 12, 13, the user presses the push button 11, releasing the ratchet and pawl mechanism and allowing the spool 6 to rotate under the influence of the sprung lead 14. The rotation of the spool 6 winds in the leads 12, 13.

Figure 6:
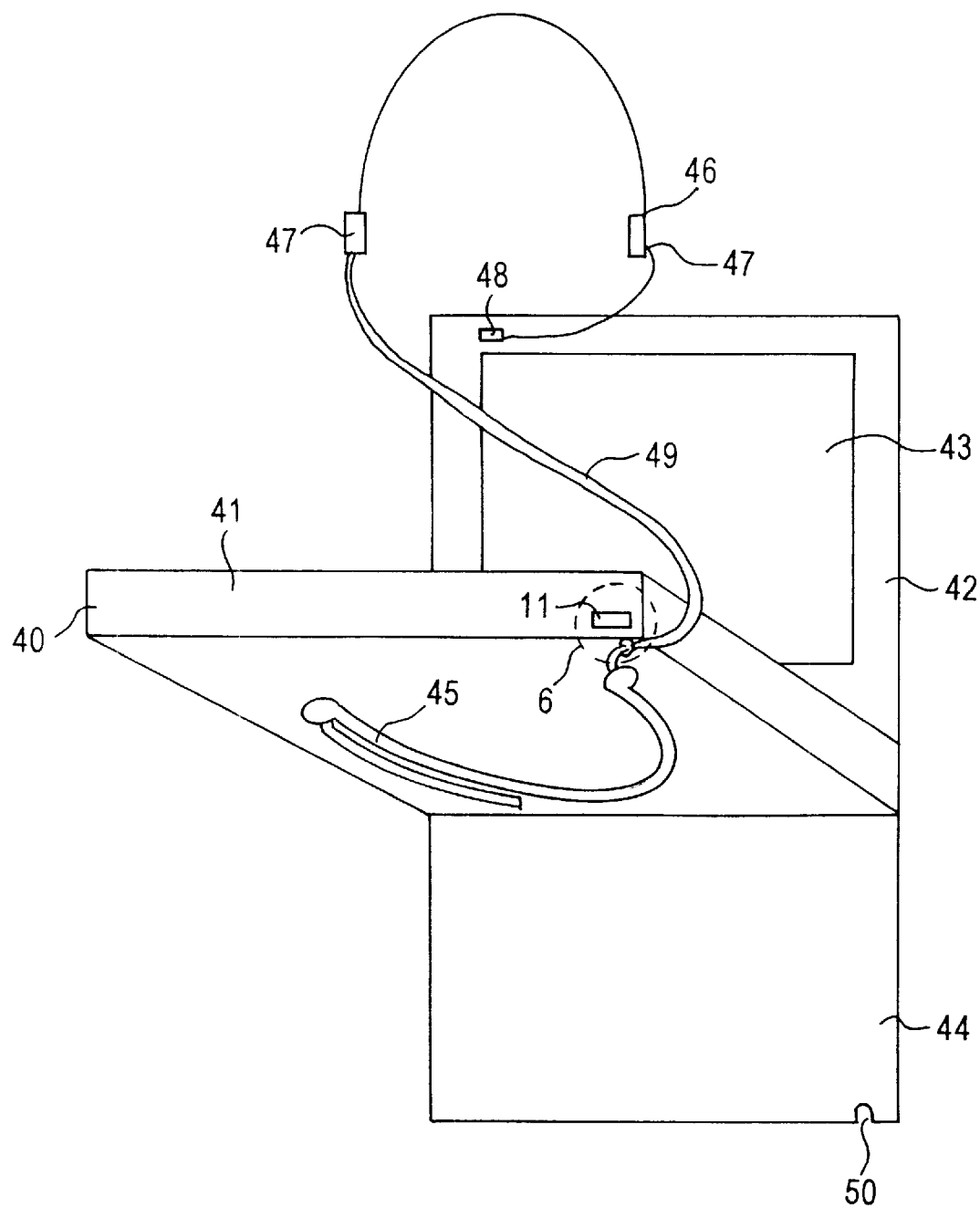
FIG. 6 shows a portable computer including a device according to the present invention.

Referring to FIG. 6, a portable computer 40 comprises a main body portion 41, lid 42 hingebly coupled to the main body portion 41, a screen 43 on the lid and a base panel 44 hingebly coupled to the main body portion 41. The base of the main body portion 41 is revealed when the base panel 44 is opened and is provided with channels 45 for receiving a light-weight headset 46 for storage. The headset 46 comprises earphones 47 and a microphone 48.

The headset 46 is electrically coupled to the computer 40 by a lead 49. The lead 49 is stored on a reeling device similar to that shown in FIGS. 1 to 5 which is located in the main body portion 41. The lead 49 can be retracted by depressing a button 11. The reeling device differs from that described above in that the lead 49 is guided through 90° so that it emerges through the base of the main body portion 41. The base panel 44 has a cut-out 50 so that it can be closed when the headset 46 in use.

Figure 7:
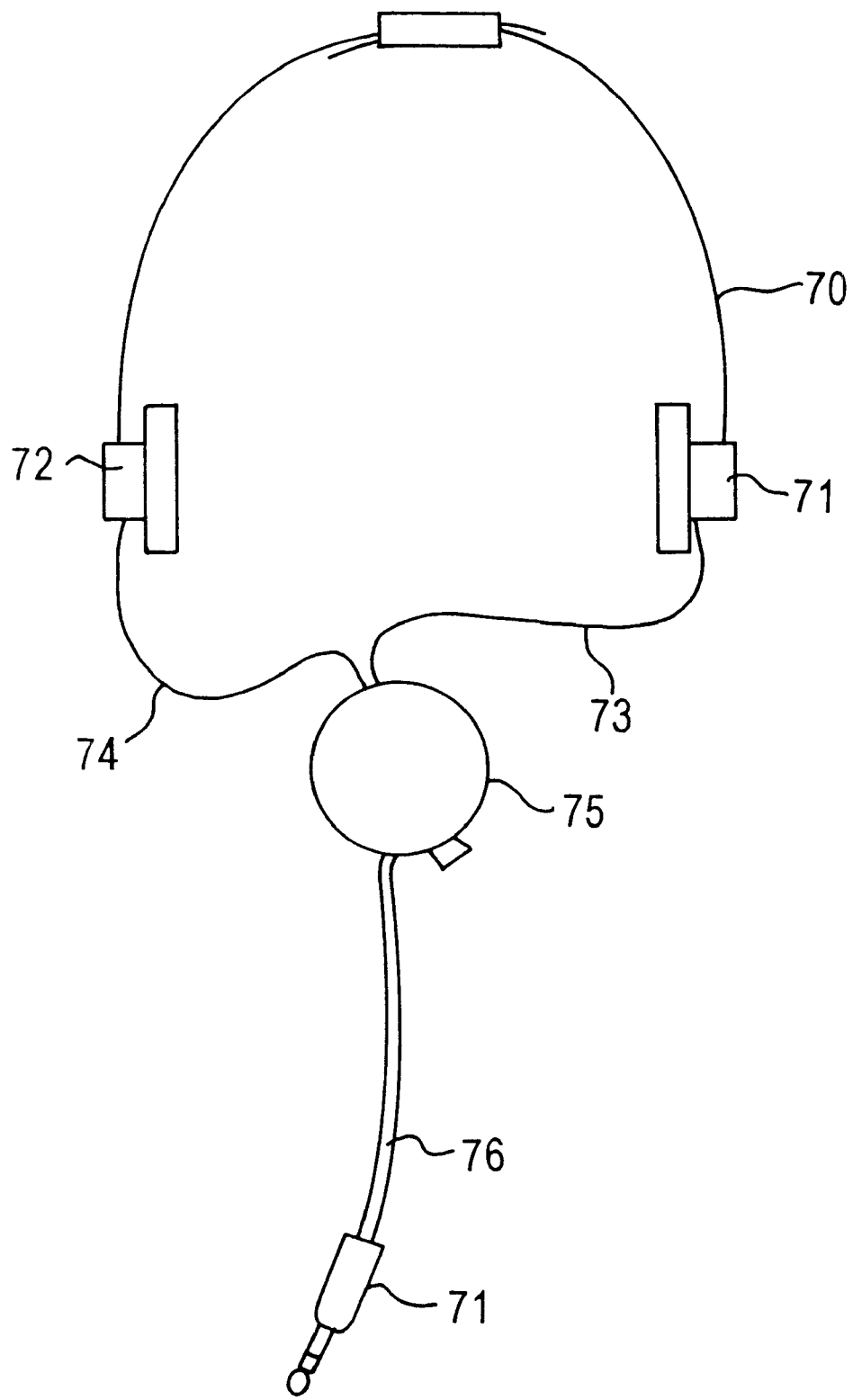
FIG. 7 shows a headset including a device according to the present invention.

Referring to FIG. 7, a headset 70 comprises first and second earpieces 71, 72. The earpieces 71, 72 are connected by respective leads 73, 74 to a housing 75. The housing 75 contains a reeling device similar to that shown in FIGS. 1 to 5 and the leads 73, 74 are connected to contact pins in the spindle thereof. A lead 76 is stored on the spool of the reeling device and is provided with a jack plug 77 at its free end.

Figure 8:
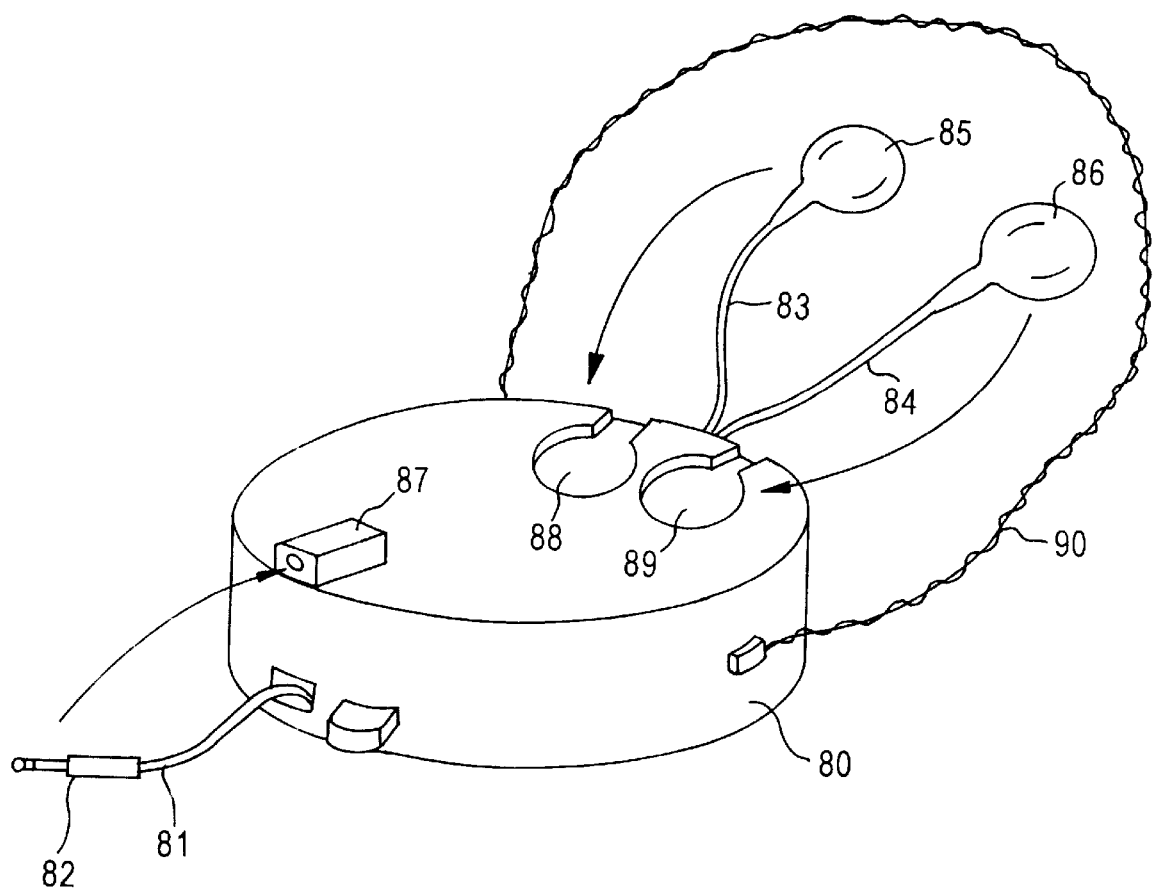
FIG. 8 shows a dual reel device according to the present invention.

Referring to FIG. 8, two reeling devices as shown in FIGS. 1 to 5 are contained in a single cylindrical housing 80. The spools of the reeling devices are coaxially arranged one beside the other and electrical connections are made between the respective spindles.

A lead 81 is stored by one of the reeling devices and is terminated at its distal end by a small jack plug 82. A pair of leads 83, 84 are stored by the other reeling device and have respective earpieces 85, 86 attached to their distal ends.

The housing 80 is provided with a projection 87 having an aperture for receiving the jack plug 82 when it is not in use. The housing 80 is also provided with a pair of recesses 88, 89 configured to receive and retain the earpieces 85, 86.

A cord 90, a chain or the like is attached to the housing 80 so that the device may be worn around the neck by a user.

A device as shown in FIG. 8 provides a convenient storage device for the leads used with a personal stereo.

In a further embodiment, a reel device according to the present invention is contain in a unit adapted to be mounted to a standard personal computer disk drive mounting.

In a still further embodiment, a reel device is as described with reference to FIGS. 1 to 5 save that the electrically conductive path is replaced by and optical waveguide, including an optical fibre, and optical connectors replace electrical connectors. In this embodiment, care must be taken to ensure that coiling of the optical waveguide doe not result in significant light loss due to the breakdown of the conditions for total internal reflection.

It will be appreciated that many electrical components or devices, e.g. tools and optical transmitters and receivers, may be attached to the lead of a reeling device according to the present invention.

It will be appreciated that many modifications may be made to the exemplary embodiments described hereinbefore. It will also be appreciated that a slip-ring free reeling device may be used advantageously in many situations where slip-ring noise is undesirable.

What is claimed is:

1. A lead storage device including first and second reeling devices, each reeling device comprising an elongate structure which provides a continuous electrically conducting path along substantially its whole length and which includes an electrical lead, a fixed spindle to which an end of the elongate structure is fixedly connected and rotary means for winding the lead around the spindle for bringing the lead into a retracted configuration from an extended configuration, wherein the reeling devices are arranged coaxially side-by-side and the electrically conducting paths of the reeling devices are electrically connected.

2. A device according to claim 1, wherein the lead of the first reeling device is terminated with a plug or an inline socket and the lead of the second reeling device is terminated with an audio input or output transducer.

3. A device according to claim 1, wherein each rotary means comprises a spool onto which the respective lead is wound when said lead is in its retracted configuration.

4. A device according to claim 3, wherein the spool of each reeling device is coupled to its spindle by a respective spring.

5. A device according to claim 4, wherein the spindle of each reeling device is coaxial with and within the respective spool.

6. A device according to claim 4, wherein the spring of each reeling device is integrated with the respective elongate structure.

7. A device according to claim 6, wherein said structures each include a flexible conductor mounted to the respective spring.

8. A device according to claim 7, wherein the conductor and the spring of each reeling device are embedded together in a flexibly resilient polymeric material.

9. A device according to claim 1, wherein each reeling device includes a releasable locking means for locking it with the respective lead in an extended configuration.

10. A device according to claim 9, wherein each locking means comprises a ratchet and pawl mechanism, the ratchets being provided on the respective rotary means.

11. A device according to claim 1, wherein each reeling device includes spring means configured to drive its rotary means for retracting the respective lead from an extended configuration.

* * * * *